United States Patent [19]
Yamasaki et al.

[11] Patent Number: 5,839,752
[45] Date of Patent: Nov. 24, 1998

[54] AIR BAG COVER AND MANUFACTURING METHOD THEREOF

[75] Inventors: Chiho Yamasaki, Kasugai-gun; Chiharu Totani, Gifu; Shigehiro Ueno, Kasugai; Akiyoshi Nagano, Ama-gun; Tetsuya Fujii, Nishikasugai-gun; Kenichi Furuta, Tajimi; Yukihiko Horiba, Konan, all of Japan

[73] Assignee: Toyoda Gosei Co., Ltd., Aichi-ken, Japan

[21] Appl. No.: 717,157

[22] Filed: Sep. 20, 1996

[30] Foreign Application Priority Data

Sep. 22, 1995 [JP] Japan ................................... 7-224832

[51] Int. Cl.⁶ ................................................. B60R 21/20
[52] U.S. Cl. ........................................ 280/728.3; 280/732
[58] Field of Search ................................. 280/728.3, 732, 280/731, 728.1, 743.1

[56] References Cited

U.S. PATENT DOCUMENTS

| | | | |
|---|---|---|---|
| 5,180,187 | 1/1993 | Müller et al. | 280/732 |
| 5,698,283 | 12/1997 | Yamasaki et al. | 280/728.3 |

FOREIGN PATENT DOCUMENTS

| | | | |
|---|---|---|---|
| 51-1932 | 8/1976 | Japan . | |
| 4151345 | 5/1992 | Japan | 280/728.3 |

*Primary Examiner*—Christopher P. Ellis
*Attorney, Agent, or Firm*—Cushman Darby & Cushman, IP Group of Pillsbury Madison & Sutro LLP

[57] ABSTRACT

An air bag cover is made of thermoplastic resin and covers an air bag. A plurality of holes are provided with the air bag cover continuously and a breakable portion is provided which severs upon the inflation of the air bag. The surface side of the breakable portion is processed by a heating process, so that protrusions which partially plug the holes are formed on the inner circumferential surface of the holes on the surface side.

16 Claims, 6 Drawing Sheets

AIR BAG COVER AND MANUFACTURING METHOD THEREOF

The priority application, Japanese Patent Application No. Hei. 7-244832, filed on Sep. 22, 1995 in Japan, is hereby incorporated by reference into the present specification.

BACKGROUND OF THE INVENTION

1. Field of the Invention

The invention relates to an air bag cover which covers a folded air bag of an air bag device and manufacturing method thereof, wherein the air bag cover is made of thermoplastic resin and used for an instrument panel, a door trim, seat back, a pad for a steering wheel or the like. Specifically, the air bag cover has a breakable portion comprising a plurality of holes formed continuously for permitting the air bag to protrude from the cover upon inflation.

2. Description of Related Art

In a conventional air bag cover which covers a folded air bag of an air bag device, there is provided a breakable portion which severs smoothly and permits the air bag to protrude upon inflation.

As the above breakable portion, a plurality of holes are typically provided as disclosed, for example, in Japanese Utility Model Publication No. Sho. 51-1932.

However, in the above air bag cover, a plurality of holes are provided on the outer surface of the air bag cover, which detracts from the air bag cover appearance.

SUMMARY OF THE INVENTION

An object of the present invention is to provide an air bag cover and manufacturing method thereof, in which the design of the air bag is improved even if a plurality of holes are provided as the breakable portion.

According to the present invention, there is provided an air bag cover comprising: a plurality of holes provided in a breakable portion which severs upon inflation of an air bag; and wherein a protrusion is formed on the inner circumference of each hole in such a manner that the protrusion partially plugs or partially closes the opening of the hole.

According to the present invention, there is provided a manufacturing method of an air bag cover comprising the steps of: forming a plurality of holes in a main body portion of the cover and heating the surface side of the holes so as to at least partially close openings of the holes while preventing the breaking load of the air bag cover from increasing.

In the air bag cover according to the present invention, even if the breakable portion is formed in such a manner that a plurality of holes are provided, the openings of the holes are partially plugged by protrusions formed in the inner circumference of the holes by a heating process.

Therefore, the openings do not appear, so that the design and appearance of the air bag cover are improved.

In the above described heating process, the material adjacent to or surrounding of the opening of the hole is melted and diffused to form the protrusion and partially plugs the hole. Hereupon, the opening surface of the hole is not be plugged completely. Therefore, the breaking load of the breakable portion is prevented from increasing.

The air bag cover of the present invention comprises a decorative sheet located on the surface side and a base member provided on the back side of the decorative sheet and molded by the injection molding. The decorative sheet comprises at least two layers, that is, the skin layer located on the surface side and the barrier layer provided on the back side of the skin layer and protecting the skin layer from molding of the base member. Therefore, the skin layer located on the surface side improves the design of the air bag cover. Needless to say, the skin layer is protected by the barrier layer provided on the back side thereof.

Further, the inner diameter of the hole before the heating process is preferably set between 0.5 mm and 1.0 mm. If the inner diameter of the pin hole is less than 0.5 mm, it is difficult to lower the breaking load of the breakable portion whether the pin hole is partially plugged or not. If the inner diameter of the pin hole is not less than 1.0 mm, it is difficult to partially plug the pin hole even after the heating process.

Furthermore, by adopting such material that has a softening point less than 200° C., it becomes possible to partially plug the hole for a short time by applying the hot air with the temperature of about 120° C. or leaving the air bag cover in the heating furnace of which temperature is controlled at about 120° C. in the heating process, that is, a wide use apparatus can be adopted, so that the heating process may be simplified.

In the manufacturing method of an air bag cover according to the present invention, the plurality of holes are partially plugged in a state such that the increase of the breaking load is prevented, so that the design of the air bag cover may be improved.

And, as described above, the inner diameter of the hole before the heating process is preferably set between 0.5 mm and 1.0 mm.

BRIEF DESCRIPTION OF THE DRAWINGS

The file of this patent contains photographs.

FIG. 5($a$) to FIG. 5($d$) are diagrams showing a process for forming a breakable portion of the air bag cover of the invention;

DETAILED DESCRIPTION OF THE PREFERRED EMBODIMENTS

The invention will be described with reference to the attached drawings.

As shown in FIGS. 1 to 4, an air bag cover 10 of one embodiment of the present invention is formed as a member of an instrument panel 8 of an automobile. The instrument panel comprises a main member 9 (FIG. 4) and the air bag cover 10.

Figure 4:
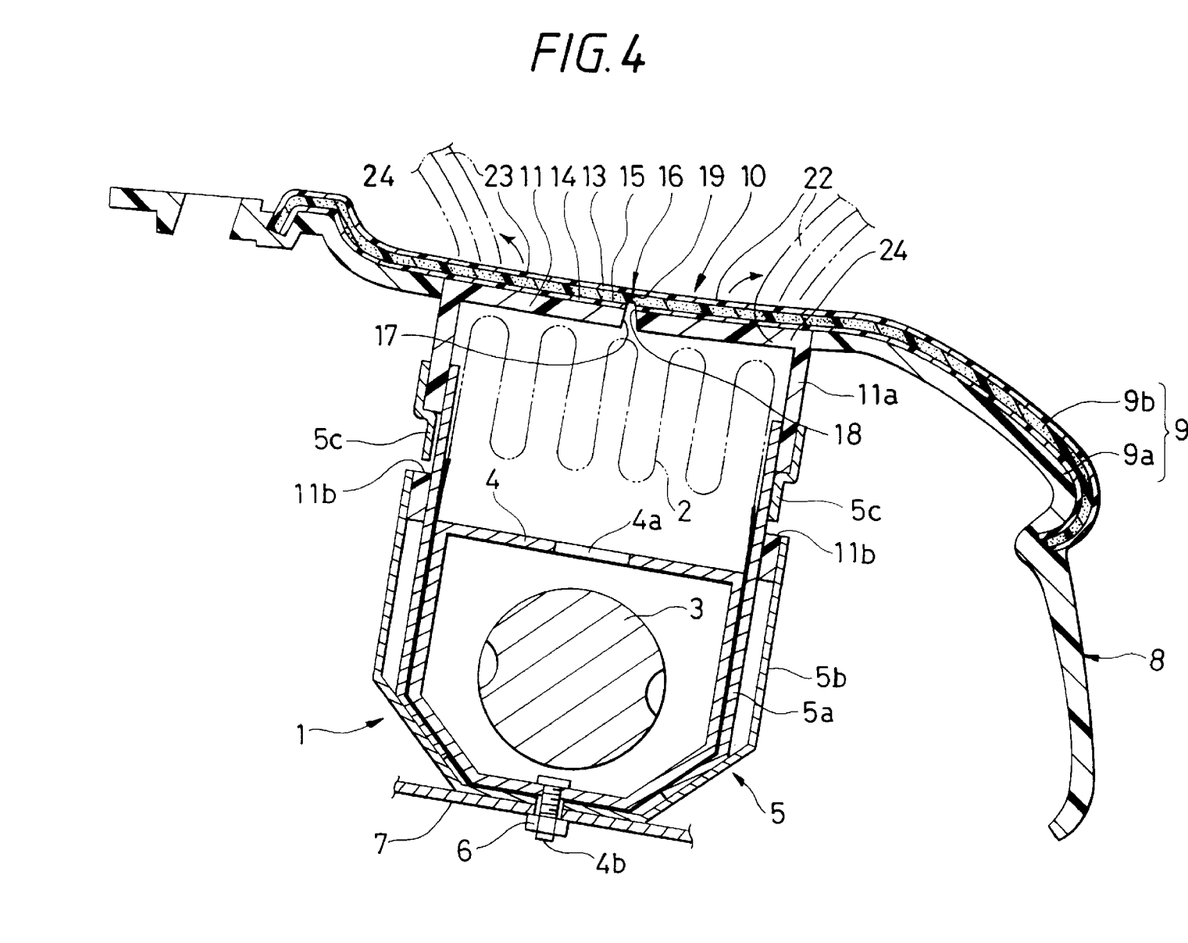
FIG. 4 is a sectional view showing a state wherein the air bag cover of the invention is used.

The main member 9 comprises a base member 9a made of hard synthetic resin such as polypropylene containing a filler and a decorative sheet 9b, disposed so as to cover the base member 9a, formed by extending a decorative sheet 12 described below.

As shown in FIG. 4, the air bag cover 10 is mounted above a folded air bag 2 of an air bag device 1 and comprises a main body portion including a base member 11 and a decorative sheet 12 disposed on the surface of the base member 11.

The air bag device 1 comprises a folded air bag 2, a cylinder-type inflator 3 for supplying the air bag 2 with gas for expansion of the air bag 2, a cylindrical diffuser 4 for diffusing the gas generated by the inflator 3 so that the gas can flow into the air bag 2 and a box-shaped case 5 covering the surroundings of the air bag 2, inflator 3 and diffuser 4.

Reference numeral 4a designates a gas communicating port through which gas sent from the inflator 3 is diffused and made to flow into the air bag 2. Reference numeral 4b denotes a plurality of bolts protruding from the diffuser 4. When these bolts are fixed with nuts 6, the case 5, air bag 2 and diffuser 4 are integrated into one body, and the air bag device 1 is fixed to a bracket 7 protruding from a frame of a vehicle.

A side wall portion of the case 5 comprises an inner panel 5a and an outer panel 5b, that is, the side wall portion has a double wall structure. On the outer panel 5b, there are provided a plurality of claws 5c, the number of which is predetermined, and the claws 5c are raised and extended to the inner panel 5a side. These claws 5c are engaged with a bracket 11a as described below.

Figure 3:
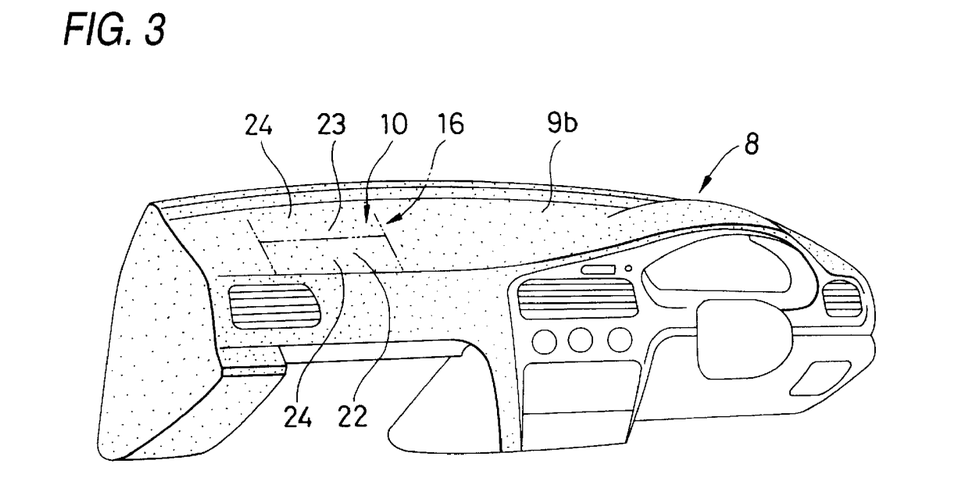
FIG. 3 is a perspective view of the embodiment of the invention.

In the air bag cover 10, a breakable portion 16 is formed into a H-shaped as viewed from above and in such a manner that two door portions 22, 23 are opened upon expansion of the air bag 2. Hinge portions 24, 24 are arranged between both upper end portions and both lower end portions of the H-shape of the breakable portion 16 and serve as the rotational center portions when the door portions 22, 23 are opened.

The base member 11 is preferably made of thermoplastic elastomer compatible with the base member 9a so as to assure the bending property of the hinge portion 24 which is not to be severed, and the bonding force with the base member 9a. In the present embodiment, the base member 9a is made of polypropylene containing a filler. Examples of thermoplastic elastomer compatible with polypropylene include olefin thermoplastic elastomer and styrene thermoplastic elastomer. The base member 11 is made of olefin thermoplastic elastomer in the present embodiment.

On the outer circumferential edge of the base member 11, there is provided a square cylinder type bracket 11a. In the bracket 11a, there are provided attaching holes 11b into which claws 5c of the case 5 of the air bag device 1 are inserted. The bracket 11a is provided so as to connect the air bag cover 10 with the case 5 of the air bag device 1 while the breakable portion 16 and the door portions 22, 23 are provided above the folded air bag 2 accurately.

Figure 1:
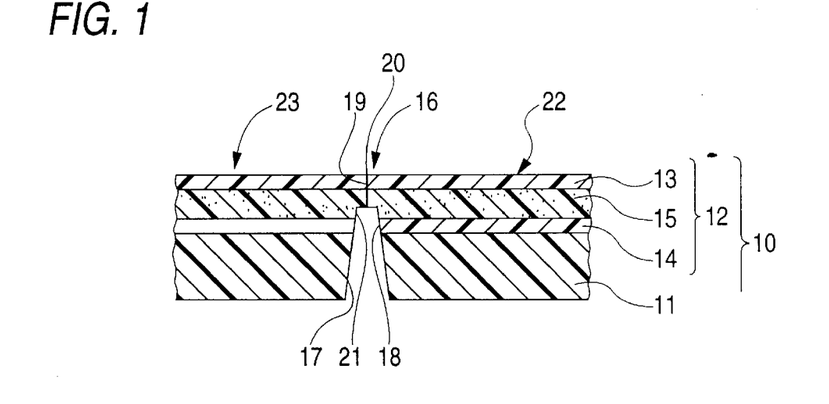
FIG. 1 is an enlarged sectional view showing a main portion of an embodiment of an air bag cover of the present invention.

The decorative sheet 12 comprises a skin layer 13 having a grain embossing pattern or the like on the surface thereof, a barrier layer 14 for protecting the skin layer 13 from injection molding of the base member 11 and a foaming layer 15 disposed between the skin layer 13 and barrier layer 14. The barrier layer 14 also protects the foaming layer 15 from injection molding of the base member 11.

The skin layer 13 preferably is made of soft thermoplastic resin such as soft polyvinyl chloride, olefin thermoplastic elastomer or the like which have a softening point less than 200° C. so as to melt the material and at least partially plug an opening of a hole 19 (described below) without increasing the breaking load required for the air bag to exit the cover.

The reason to adopt such a resin that has a softening point less than 200° C. is as follows. That is, it is possible to plug the hole for a short time by applying the hot air of a temperature of about 120° C. or by leaving the air bag cover in the heating furnace of which temperature is controlled at about 120° C. in the heating process, so that the heating process may be simplified.

In the present embodiment, the skin layer 13 is made of soft polyvinyl chloride with the softening point of 180° C., the barrier layer 14 is made of olefin thermoplastic elastomer the same as the base member 11 and the foaming layer 15 is made of foaming polypropylene. The thickness of the skin layer 13 is preferably 0.6 mm, the thickness of the barrier layer 14 is preferably 1.0 mm, and the thickness of the foaming layer 15 is preferably 0.3 mm.

Figure 2:
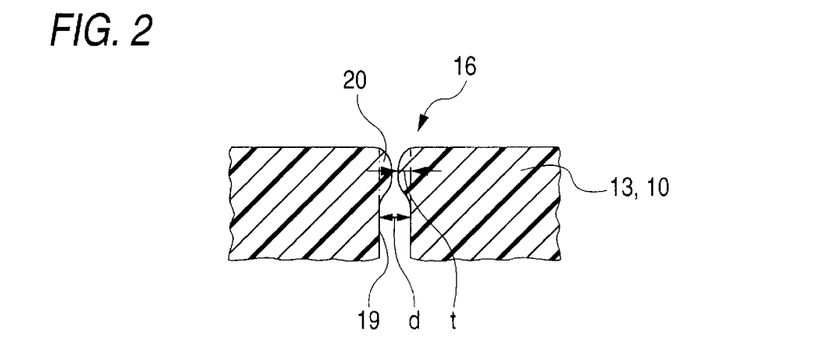
FIG. 2 is a further enlarged sectional view showing a main portion of FIG. 1.

At the breakable portion 16, a recess 17 is formed in the base member 11, a cut-away portion 18 is formed in the barrier layer 14, and a plurality of pin holes 19 are formed in the skin layer 13. As shown in FIG. 2, openings of the pin holes 19 are partially plugged or partially closed by protrusions 20 formed on the inner circumference of the pin holes 19 by the heating process. Hereupon, the cut-away portion 18 is formed at the same time when the recess 17 of the base member 11 is formed while the recess 17 is extended to the foaming layer 15. Therefore, another recess 21 is formed at the foaming layer 15.

The recesses 17, 21 may be formed either continuously or intermittently at a position aligning with the H-shape of the breakable portion 16.

The inner diameter of the pin hole 19 before the heating process is preferably set between 0.5 mm and 1.0 mm (0.75 mm in the embodiment). If the inner diameter of the pin hole 19 is less than 0.5 mm, it is difficult to lower the breaking load of the breakable portion 16 whether the pin hole 19 is partially plugged or not. If the inner diameter of the pin hole 19 is not less than 1.0 mm, it is difficult to plug the pin hole 19 even after the heating process.

Further, the interval of the pin holes 19 is preferably set to less than 2 mm while aligning with the H-shape of the breakable portion 16 (1 mm in the embodiment). If the interval is not less than 2 mm, the breaking load 16 is increased, so that the deployment property is likely to deteriorate.

If the holes 19 formed in the skin layer 13 are not pin holes but are slits, the width of the slit 19 is preferably set between 0.5 mm and 1.0 mm. If the width of the slit 19 is less than 0.5 mm, it is difficult to lower the breaking load of the breakable portion 16 whether the slit is plugged or not. If the width of the slit 19 is not less than 1.0 mm, it is difficult to plug the slit 19 even after the heating process. The interval of the hole 19 is preferably set to less than 2 mm because of the same reason as described above.

The air bag cover 10 and instrument panel 8 are manufactured as follows. First, the decorative sheet 12 including the decorative sheet 9b is formed into a predetermined shape for being embedded in the instrument panel 8 by means of vacuum forming. And as shown in FIG. 5(a), a plurality of pin holes 19 are formed by penetrating a pin, or a plurality of slits are formed by penetrating a thin cutter P.

Next, the decorative sheet 12 formed into the predetermined shape is set in a mold for molding the base member 9a of the main member 9 and the base member 9a is formed by injection molding.

Figure 5:
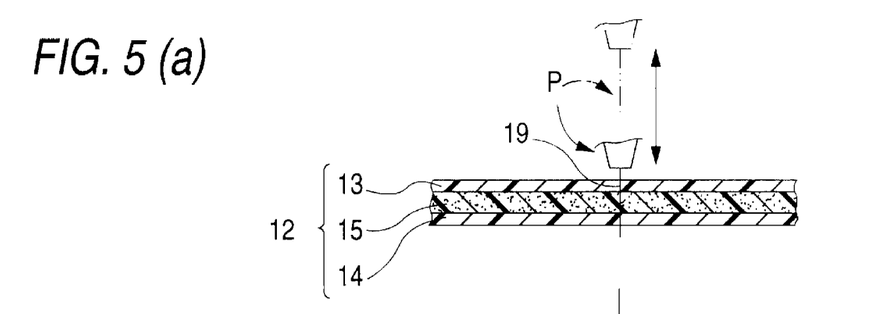

Then, the decorative sheet 12 is set in an injection mold for molding the base member 11, and the base member 11 is molded, as shown in FIG. 5(b).

After releasing the resultant product, the recesses 17 and 21 are formed using a working horn H of a supersonic welder and an attachment hole 11b is formed in the bracket 11a of the base member 11 as shown in FIG. 5(c).

Next, as shown in FIG. 5(d), the heating process to partially plug the opening of the pin hole 19 is performed. The heating process is as follows. Hot blown air with a temperature of about 120° C. is applied to the decorative sheet 12 from 2 mm to 3 mm from above, while being moved at the speed of 5 cm/sec. Alternatively, the air bag cover 10 may be left in a heating furnace of which temperature is controlled to about 120° C. for about one minute.

In the above described heating process, the material adjacent to or surrounding of the opening of the pin hole 19 is melted and diffused to form the protrusion 20 which plugs the pin hole 19. However, to prevent the breaking load of the breakable portion 16 from increasing, the opening of the pin hole 19 must not be plugged completely. Therefore, it should be noted that the preferable heating temperature and heating time are selected corresponding to the heating method to partially plug the holes.

For example, in the case where the heating furnace is used, the protrusion 20 on the inner circumferential surface of the pin hole 19 tends to be formed with an even height. Therefore, the protrusion height t is preferably set between 30% and 50% of the inner diameter d of the pin hole 19. If the height is less than 30% of the inner diameter d, it is difficult to partially plug the opening of the pin hole 19 and thus improve the design of the air bag cover 10. If the height is not less than 50% of the inner diameter d and the protrusion 20 is formed on the inner circumferential surface of the pin hole 19, the material on the inner circumferential surface of the pin hole 19 is melted and welded completely closing the hole, so that the breaking load is likely to increase.

On the other hand, in the case where hot blown air is applied from one direction for the heating process, it is difficult to form the protrusion 20 on the inner circumferential surface of the pin hole 19 with the even height. In such a case, there is a possibility that the breaking load will not increase since a portion of the protrusion height t of the protrusion 20 may be between 30% and 50% of the inner diameter d. And even if it seems that the opening of the pin hold 19 is plugged completely in appearance, the melted portion of the inner circumferential surface of the pin hole 19 may not be welded, so that the breaking load may not increase.

Therefore, heating time and heating temperature of the heating process may be set suitably corresponding to the heating method so as not to increase the breaking load.

It should be noted that the base member 9a, 11 and barrier layer 14 of the decorative sheet 9, 12 are composed of the same kinds of material or they have compatibility with each other. Accordingly, they are bonded to each other without adhesive.

Further, a heated cutter or high-frequency cutter may be used other than the supersonic welder to form the recess 17, 21.

To connect the air bag device 1 to the instrument panel 8, the bracket 11a is inserted between the inner panel 5a and outer panel 5b. The claws 5c are respectively inserted into and secured to the mounting holes 11b. If the bracket 7 is fastened to the bolts 4b by the nuts 6 and the other end of the bracket 7 is fixed to a frame (not shown), then the air bag device 1 can be connected with the instrument panel 8 and can be then mounted in the automobile together with the instrument panel 8. Preselected meters and other similar parts can be installed in the automobile when the instrument panel 8 is mounted into the automobile.

When gas is discharged from the inflator 3, gas flows through a gas flow hole 4a of the diffuser 4 into the air bag 2, so that the air bag 2 allows the breakable portion 16 to break and also allows the door portions 22, 23 to open or rotate about the hinge portions 24, so that the air bag can be deployed from the instrument panel 8.

And the instrument panel 8 of the present embodiment may be improved in design since the opening of the pin hole 19 does not appear on the surface of the air bag 10.

Hereupon, there is shown a result of a tension comparison test with respect to the decorative sheet 12 in Table 1. The test piece of the decorative sheet 12 was prepared as follows: The skin layer made of soft polyvinyl chloride (PVC) (thickness 0.6 mm) and the foaming layer made of foaming polypropylene (thickness 3 mm) were bonded together. Next, the following three kinds of process were given. Firstly, the holes having an inner diameter of 0.75 mm were provided at the interval of 1 mm pitch. Secondly, the openings of the holes were stopped by the heating process in which hot, blown air with a temperature of 120° C. was applied to the decorative sheet from 2 mm to 3 mm above while being moved at the speed of 5 cm/sec. Thirdly, no holes were provided. Further, olefin thermoplastic elastomer (TPO) (softening point 180° C.) was used for the skin layer instead of the soft polyvinyl chloride. That is, six kinds of the decorative sheets were prepared. They were formed into test pieces each having a JIS No. 2 dumbbell shape and the test pieces were pulled at a speed of 200 mm/min. by an autograph tension tester.

TABLE 1

| Test Piece | Material of Skin Layer | Specification | Breaking Load (N/10 mm) | Breaking Extension (%) |
| --- | --- | --- | --- | --- |
| 1 | PVC | No Holes, No Heating Process | 152 | 280 |
| 2 | PVC | Holes, No Heating Process | 116 | 25 |
| 3 | PVC | Holes, Heating Process | 90.5 | 18 |
| 4 | TPO | No Holes, No Heating Process | 85.5 | 630 |
| 5 | TPO | Holes, No Heating Process | 65 | 35 |
| 6 | TPO | Holes, Heating Process | 60.5 | 20 |

Figure 6:
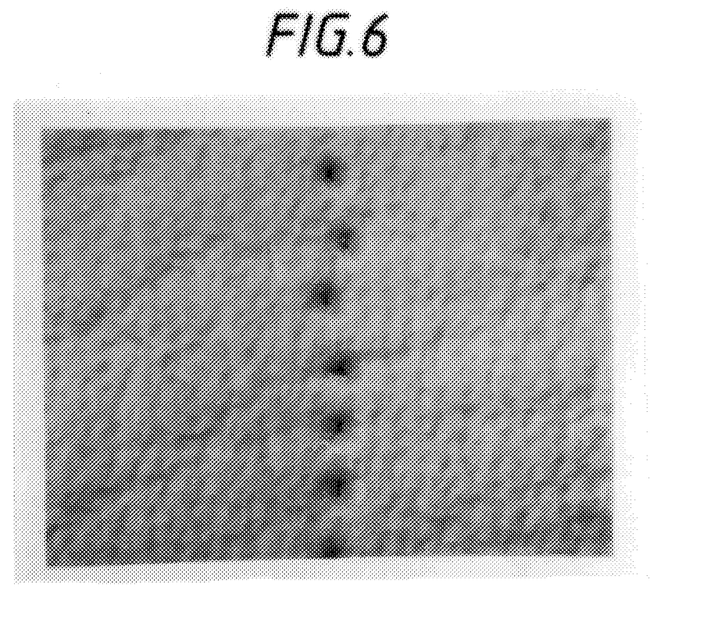
FIG. 6 is an enlarged plan view of a test piece for the tensile comparison test, in which holes are still opened.
Figure 7:
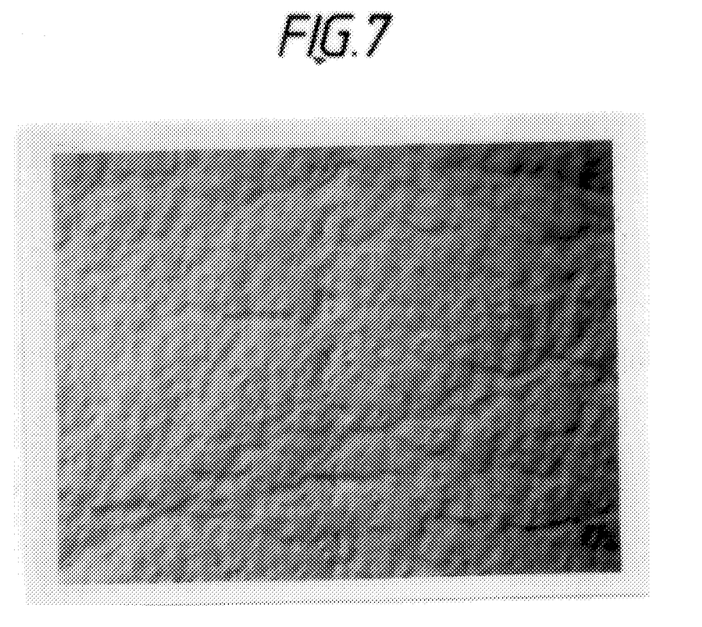
FIG. 7 is an enlarged plan view of a test piece for the tensile comparison test, in which the openings of the holes are partially plugged due to a heating process.

A microscope photo (magnification 10) of a surface of the test piece 2 is shown in FIG. 6 and the same of the test piece 3 is shown in FIG. 7.

As shown in Table 1, even if the case where the holes are partially plugged by the heating process, the decorative sheet is broken at substantially same specification (load and extension) as the case where no holes are plugged. Taking FIGS. 6 and 7 into consideration, it is understood that the increase of the breaking load can be prevented even if the design is improved.

The air bag cover 10 of the above described embodiment of the present invention comprises a decorative sheet 12 located on the surface side and the base member 11 provided on the back side of the decorative sheet 12 and molded by injection molding. The decorative sheet 12 comprises at least two layers, that is, the skin layer 13 located on the surface side and the barrier layer 14 provided on the back side of the skin layer 13 and protecting the skin layer 13 from molding of the base member 11. Therefore, the skin layer 13 located on the surface side improves the design of the air bag cover. Needless to say, the skin layer 13 is protected by the barrier layer 14 provided on the back side thereof.

The air bag cover 10 of the present embodiment has a three-layers structure which has the skin layer 13, the barrier layer 14 and the foaming layer 15. However, two-layer structures which do not have the foaming layer 15 may be applied to the air bag cover even if the touch feeling is is deteriorated.

Figure 8:
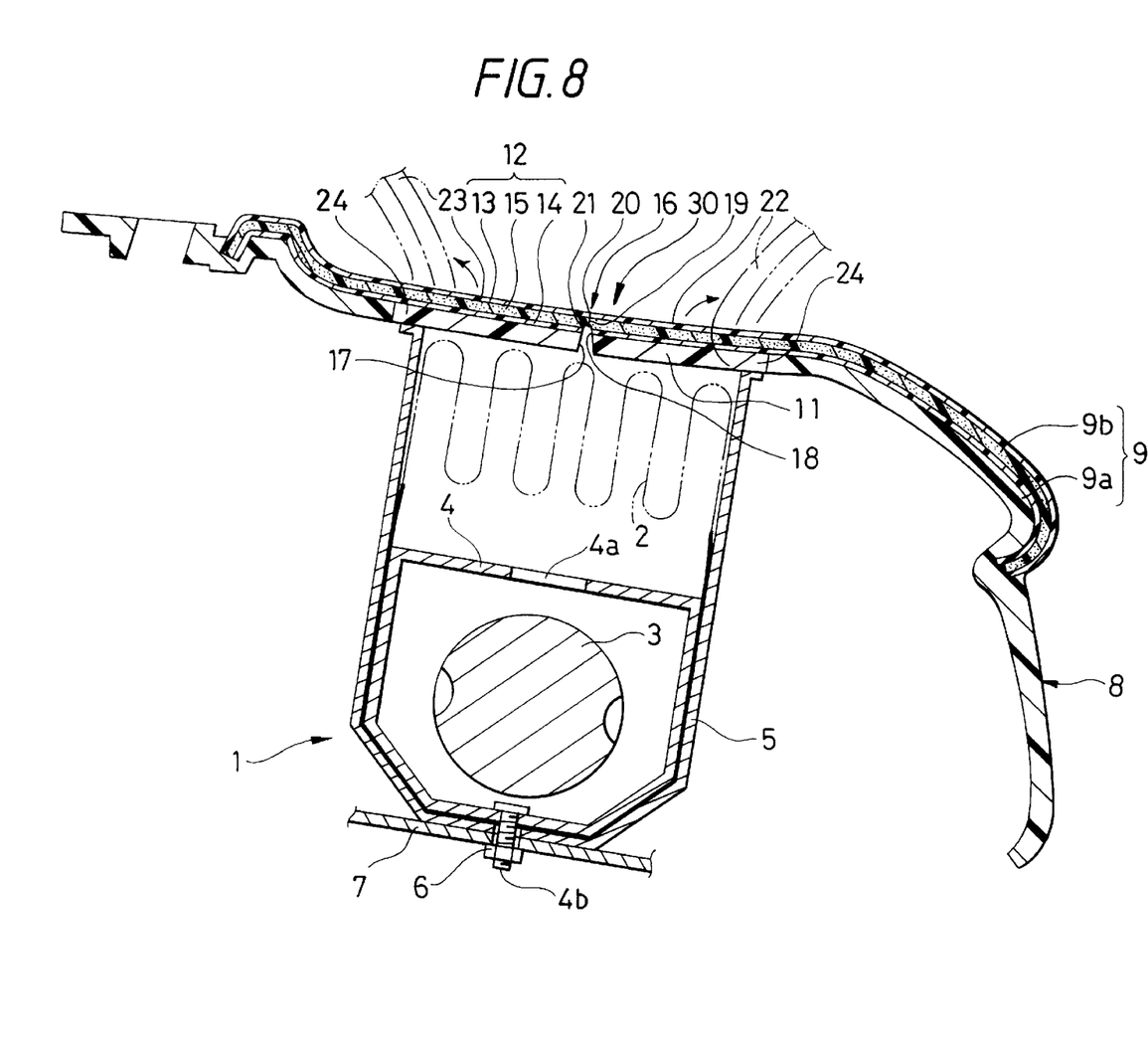
FIG. 8 is a sectional view showing another embodiment of the present invention.

Further, in the air bag cover 10, the bracket 11a which connects the air bag cover 10 with the case 5 of the air bag device 1 is provided so as to dispose the breakable portion 16 and door portions 22, 23 above the folded air bag 2 accurately. However, the bracket may not be provided, as shown in the air bag cover 30 in FIG. 8, if it is possible to dispose the air bag cover above the air bag accurately without the bracket.

Figure 9:
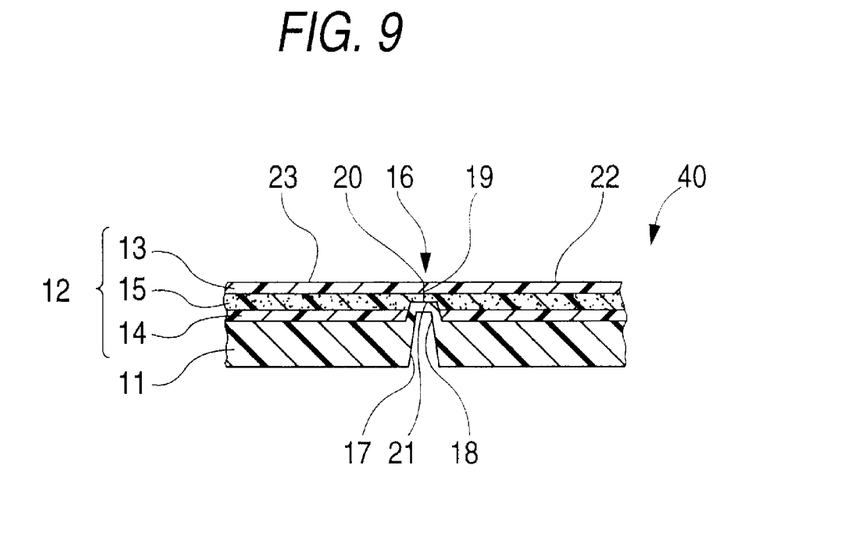
FIG. 9 is an enlarged sectional view of still another embodiment of the invention.

Furthermore, in the aforementioned air bag cover 10, after the base member 11 and decorative sheet 12 are integrated, the recesses 17, 21 and cut-away portion 18 are formed at the same time by means of the working horn H. However, the cut-away portion 18 may be formed in the barrier layer 14 of the decorative sheet 12 before injection-molding the base member 11. In this case, the decorative sheet 12 is formed into a predetermined shape, and the holes 19 and cut-away portion 18 are formed. After that, the base member 11 is molded and the recess 17 is formed in the base member 11. Therefore, as shown in the air bag cover 40 in FIG. 9, the base member 11 is molded so as to protrude into the foaming layer 15 over the cut-away portion 18 of the barrier layer 14. In this case, it is considered that the foaming layer 15 and skin layer 13 are damaged by heat and injection pressure at the injection molding of the base member 11. However, the width of the cut-away portion 18 is very small (less than 0.5 mm), so the foaming layer 15 and skin layer 13 are never damaged enough to damage is the outer surface of the decorative sheet 12.

The openings of the holes 19 are partially plugged after molding the base member 11. It is allowable to form the holes 19 at any time before or after the cut-away portion 18 is formed, or after the base member 11 is molded, that is, prior to the heating process. This condition is the same as manufacturing the air bag cover 10, that is, at any time prior to the heating process.

Further, the recess 17 may be formed at the same time of forming the base member 11 by means of the mold surface having the shape of the recess 17 other than a cutter or the like.

Figure 10:
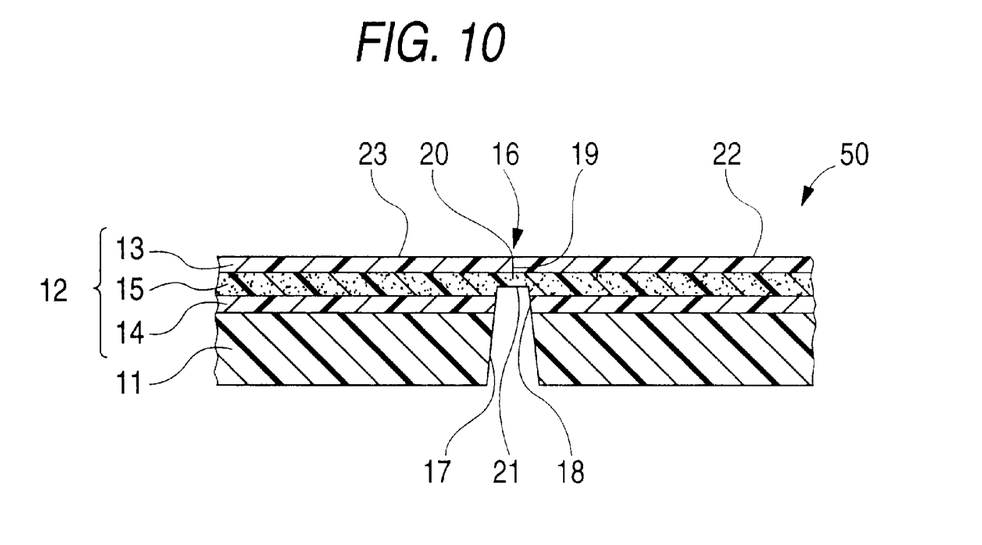
FIG. 10 is an enlarged sectional view of yet another embodiment of the invention.

In the aforementioned air bag cover 10, 30 and 40, the holes 10 penetrate up to the recess 21 provided in the foaming layer 15. However, as shown by the air bag cover 50 in FIG. 10, it is allowable to penetrate the holes 19 up to the middle of the foaming layer 15. The foaming layer 15 is easily broken by nature, so that it does not affect the breakage of the decorative sheet 12 whether the holes 19 or recess 21 is formed or not in the foaming layer 12. And the holes 19 are formed and partially plugged after the recess 21 is formed.

The aforementioned air bag covers 10, 30, 40 and 50 are used for the instrument panel 8. However, the present invention may be applied to the pad of a door trim, seat back, steering wheel or the like which are disposed so as to cover the air bag device, other than the instrument panel. In these cases, a decorative sheet with a single layer may be formed of soft thermoplastic resin such as soft polyvinyl chloride, olefin thermoplastic elastomer or the like which have a softening point less than 200° C. by injection molding.

What is claimed is:

1. An air bag cover for covering an air bag comprising:
    a main body portion including
        a plurality of holes provided at a breakable portion of the main body portion, said breakable portion severing upon inflation of the air bag; and
        a protrusion formed on an inner circumference of each of said holes in such a manner that the protrusion closes at least a portion of an opening of the associated hole.

2. The air bag cover according to claim 1, wherein said main body portion includes:
    a decorative sheet disposed on an outer surface of the air bag cover; and
    a base member disposed on the back side of the decorative sheet and molded by injection molding;
    wherein the decorative sheet comprises a skin layer disposed on the surface side and a protecting layer which protects the skin layer from heat and pressure of the injection molding of the base member, said holes being provided in the skin layer.

3. The air bag cover according to claim 1, wherein the material of said main body portion is such that each protrusion is formed by a heating process.

4. The air bag cover according to claim 3, wherein an inner diameter of each hole before the heating process is set between 0.5 mm and 1.0 mm.

5. The air bag cover according to claim 2, wherein the skin layer is made of material which has a softening point less than 200° C.

6. The air bag cover according to claim 3, wherein the holes are in the form of slits of which a width before the heating process is set between 0.5 mm and 1.0 mm.

7. The air bag cover according to claim 2, further comprising a foaming layer disposed between the skin layer and protecting layer.

8. The air bag cover according to claim 1, wherein a height of each protrusion is set between 30% and 50% of the inner diameter of each hole.

9. A method of manufacturing an air bag cover comprising the steps of:
    forming a plurality of holes in a main body portion of the air bag cover; and
    applying heat to the holes so as to cause material around the holes to melt and at least partially close the holes without increasing a breaking load of the air bag cover upon inflation of an air bag.

10. The method according to claim 9, further comprising the steps of:
    providing the main body portion by:
    forming a decorative sheet; and
    molding a base member on a back side of the decorative sheet by injection molding;
    wherein the holes are provided in the decorative sheet.

11. The method according to claim 9, wherein an inner diameter of each hole before the heating step is set between 0.5 mm and 1.0 mm.

12. The method according to claim 9, wherein the holes are in the form of slits of which a width before the heating step is set between 0.5 mm and 1.0 mm.

13. The method according to claim 11, wherein a pin is used to form the holes.

14. The method according to claim 12, wherein a cutter is used to form the slits.

15. The method according to claim 9, wherein the heating step includes applying hot air to the openings of the holes from above while the hot air is moved.

16. The method according to claim 9, wherein the heating step includes leaving the air bag cover in a temperature controlled heating furnace.

* * * * *